United States Patent Office 3,009,893
Patented Nov. 21, 1961

3,009,893
EXTRUDABLE POLYPYRROLIDONE COMPOSITIONS AND PROCESS OF EXTRUDING SAME
Carl E. Barnes, Afton, and William O. Ney, Jr., Lincoln, Township, Washington County, Minn., and Joseph D. Park, Boulder, Colo., assignors to Minnesota Mining and Manufacturing Company, St. Paul, Minn., a corporation of Delaware
No Drawing. Filed Mar. 26, 1958, Ser. No. 723,951
6 Claims. (Cl. 260—30.2)

This invention relates to new and useful compositions containing polypyrrolidone and more particularly it relates to compositions including polypyrrolidone and certain melting point depressants therefor, which compositions are suitable for melt casting or extrusion of clear, unoriented films and fibers of polypyrrolidone; and to the shaped articles thus produced.

Polypyrrolidone has been known for some time to possess certain desirable characteristics which render it very useful for the formation of fibers and films; but because of its unique combination of physical properties it has not heretofore been possible to exploit this polymer to provide useful articles of commerce. It is found, for example, that polypyrrolidone is dissimilar in many ways from other known polyamides and its behavior cannot be predicted by analogy. Owing to its thermal instability, it is rapidly degraded at or even somewhat below its melting point, whereby monomeric pyrrolidone is formed and the inherent viscosity of the polymer decreases. In fact, polypyrrolidone is fundamentally different in its properties from the condensation superpolyamides of the prior art as described, for example, in U.S. Patents Nos. 2,071,250, 2,071,253 and 2,130,948. It is found that, in general, conditions which are suitable for handling the prior art condensation-type polyamides are quite useless in connection with polypyrrolidone. Even the methods of synthesis are different since polypyrrolidone is not a linear condensation polyamide as defined in the art, inasmuch as it is not formed with the elimination of a simple molecule. So far as can be determined the problems arising in handling polypyrrolidone are unique to that material, inasmuch as the physical properties of polypyrrolidone differ in many details from those of other polyamides; so that suitable working conditions have had to be determined anew at each stage of fabrication, rather than from what was known in the prior art.

It has heretofore been known to prepare solutions of polypyrrolidone in anhydrous formic acid and employ such solutions for the casting of films of polypyrrolidone, as described in U.S. Patent 2,711,398. It has further been known to employ low molecular weight non-solvent acids in addition to formic acid to prevent cloudiness and opacity of the film produced owing to crystallization, as described in U.S. Patent No. 2,734,043. These solutions of the prior art are suitable for casting films on glass surfaces and for wet or dry spinning to produce fibers, but they are not useful for continuous casting onto a hot roller or for melt-extrusion of films or melt-spinning of fibers. Operation from the melt is desirable for the production of film and fibers because of the convenient and rapid operation of such a process, which permits of economical production on a large scale.

It is an object of this invention to produce a composition containing polypyrrolidone which is suitable for the continuous melt-extrusion of films and fibers. A further object of this invention is to provide a process for preparing clear, transparent, unoriented, weakly crystalline or noncrystalline films and fibers of polypyrrolidone. Other objects will become apparent hereinafter.

The foregoing and other objects of the invention are realized by providing compositions comprising a major amount of polypyrrolidone in admixture with a minor amount of certain organic compounds which are melting point depressants for polypyrrolidone. These substances can be characterized as stable organic compounds which have solubility parameters ($\delta$) ranging from about 10 to about 20, which boil at a temperature above about 150° C., which melt below about 270° C., and which are inert with resepect to polypyrrolidone. The resulting compositions may vary in state from being fluid to solid at room temperature; but they melt at temperatures below that of polypyrrolidone and therefore the tendency of the polymer to degrade in molecular weight and to evolve monomer during fabrication is markedly reduced.

The solubility parameter ($\delta$) of the substances suitable for use in the invention is a characteristic of each organic compound which can be calculated from known or determined physical constants in several ways. The report of Burrell, in the Official Digest, v. 27, No. 369, October 1955, pages 726–758, sets forth a number of methods for determining solubility parameter values and lists the values obtained for a large number of compounds. The solubility parameter can also be expressed as the square root of the cohesive energy density, which characteristic could also be used in defining the useful agents of the invention; however, the $\delta$ values are smaller and more conveniently used and hence will be employed herein.

The organic melting point depressant agents which are employed herein are conveniently liquids or low-melting solids which, as stated, boil at temperatures above about 150° C. at atmospheric pressure and which are stable, i.e. not decomposed under the conditions of extrusion which includes temperatures up to about 270° C. under inert atmospheres. Ordinarily, the lower boiling liquids are employed in such amounts that they do not produce excessive foaming, but if necessary such substances can be used under superatmospheric pressure. However, for most convenient operation, it is preferred to use materials which meet the other stated requirements and which boil above about 200° C. While solid substances can be used as melting point depressants, they should melt at a temperature below that of temperatures used in melt-extrusion of polypyrrolidone, i.e. about 270° C., if they are to be practically useful.

The agents employed to lower the melting point of the polypyrrolidone need not be solvents for the polymer. While solvents can be used, the object of the invention is not to obtain a true solution, but rather a lowering of the melting point and/or the melt viscosity. This result can be accomplished by substances which are not ordinarily considered to be solvents. For example, sorbitol, pentaerythritol, caprolactam, acetamide and even low molecular weight polymers, such as low molecular weight polyethylene glycol, which fall within the stated parameters, can be used.

It has been found that mixtures containing polypyrrolidone and one or more of the above-defined class of organic substances serve to plasticize or render the polypyrrolidone fusible at lower temperatures so that it can be melt-extruded or melt-spun without markedly affecting the molecular weight of the polymer, as ordinarily experienced. The melt-viscosity of the compositions is in most instances found to be lower than that of polypyrrolidone alone, so that the rate of extrusion is very substantially increased. It is noted that the compositions of the invention may resemble true solutions at their liquefaction temperatures, although at lower temperatures there may be a separation of phases with the formation of a gel-like mass which may show syneresis on standing. The syneresed mass can be reheated to give a melt for usion. In any case, it is found that the compositions
[of th]e invention can be melt-spun or melt-extruded, using
ordinary extruding apparatus commonly employed for
[the] purpose. Thereafter, any of the substance employed
[in] lowering the melting point of the polymer which may
[rem]ain in the extruded film or fiber can be removed if
[desi]red, as by washing or solvent extraction, evaporation
[and t]he like.

[P]olypyrrolidone suitable for use in the compositions
[of th]e invention can be prepared by any of the processes
[kno]wn to the art, and is desirably of a relatively high
[mol]ecular weight. However, polypyrrolidone polymers
[vary]ing widely in molecular weight are suitable.

[O]ne of the advantages of this invention is that the
[tend]ency for crystallization of polypyrrolidone, which is
[so] pronounced under low temperature operating conditi[on]s such as the heretofore known solvent-casting of
[p]yrrolidone films, is greatly hindered under the higher
[temp]erature conditions of operation possible with the
[com]positions of this invention. It is found, for example,
[that] clear transparent films of polypyrrolidone showing
[very] little if any tendency towards crystallization can be
[eas]ily melt-cast at temperatures upwards of about 200°
[C. e]mploying compositions of this invention. This temperature range is apparently above the crystallization temp[era]ture of polypyrrolidone, which is believed to be about
[180°] C.

[T]he compositions of this invention are stable under
[ordi]nary storage conditions for prolonged periods of time
[and] if heated preparatory to casting or extrusion and then
[cool]ed without casting they can be reused without delete[rio]us effects upon the products. They are further stable
[for] relatively long periods of time at their liquefaction
[temp]eratures although some evaporation of lower-boiling
[solv]ents can be expected. The polypyrrolidone is found
[to un]dergo little or no degradation under these conditions
[and] the liquefied compositions are stable with respect to
[visc]osity for prolonged periods so long as the melting
[poin]t depressant agent is not lost. An advantage of films
[and] fibers provided by this invention is that they are
[not] as readily discolored on standing as are products pro[duce]d by the heretofore known method.

[In] the production of polypyrrolidone, the polymerization mixture contains inter alia polymer, alkaline cata[lyst, ] ash-forming substances and pyrrolidone monomer.
[In o]rder to prevent rapid degradation of the polymer
[when] heated, the alkaline catalysts and ash-forming sub[stanc]es must be removed and to this end thorough washing is employed, which also effectively removes all of
[the p]yrrolidone. Polypyrrolidone consequently contains
[too l]ittle monomer to have an effect on the melting point.
[How]ever, it has been found that pyrrolidone, when added
[in su]fficient amount to the polymer, will in fact lower
[the m]elting point of the mixture. The presence of pyr[rolid]one in the purified polymer does not lead to further
[poly]merization, but rather surprisingly it functions to
[lowe]r the melt viscosity in much the same way as any
[othe]r of the agents herein described which could not
[bind ]to the polypyrrolidone or become incorporated into
[the p]olymer.

[Am]ong the organic compounds which have physical
[chara]cteristics required in the depressant agents of the in[venti]on and are inert with respect to polypyrrolidone; and
[whic]h thus are suitable for incorporation into the compositi[ons] of this invention, are alkanolamines such as di[ethan]olamine, ethanolamine, diethanol ethylene diamine,
[prop]anolamine and the like; amides, for example form[amid]e, dimethylformamide, acetamide, dimethylacet[amid]e, caprolactam, N-methylpyrrolidone and the like;
[polyh]ydric alcohols such as glycerin, pentaerythritol, ethyl[ene ]glycol, diethylene glycol, propylene glycol, butane[diol, ]sorbitol and the like; and other similar substances.
[Glyc]erin appears to be an especially useful melting point
[depr]essant agent, in that fibers made therefrom have par[ticula]rly high inherent viscosity values as compared with those made from polymer containing other agents. The
following table sets forth a number of examples of useful
melting point depressants and their boiling points and
solubility parameters.

TABLE I

| Melting point depressant | Boiling point, ° C. | Solubility parameter, δ |
|---|---|---|
| Glycerin | 290 | 16.5 |
| Diethylene glycol | 245 | 9.1 |
| Cyclohexanol | 161.5 | 11.4 |
| n-Hexanol | 157 | 10.7 |
| Benzyl alcohol | 205 | 12.1 |
| N-ethylacetamide | 205 | 12.3 |
| Furfuryl alcohol | 171 | 12.5 |
| N-ethylformamide | 197-199 | 13.9 |
| Ethylene glycol | 198-200 | 14.2 |
| Butyrolactone | 206 | 15.5 |
| n-Octanol | 195 | 10.3 |
| N,N-diethyl formamide | 177 | 10.6 |
| Dimethylphthalate | 282 | 10.7 |
| N,N-dimethylacetamide | 165-175 | 10.8 |
| N,N-dimethylformamide | 153 | 12.1 |

It is apparent that in general the organic melting point
depressant substances of this invention vary widely as respects structure and cannot be defined in chemical terms
except with respect to inertness toward polypyrrolidone,
but must be defined as is herein done using a combination of parameters.

As stated, the compositions of this invention comprise a
major amount of polypyrrolidone and a minor amount of
the melting point depressant agent. Preferably, an amount
of the depressant substance which produces a definite decrease in melting point of the polypyrrolidone, up to about
30 percent of depressant agent by weight is used. The
liquefaction temperatures of the resulting compositions
vary from about the melting point of polypyrrolidone,
namely about 260° C., downwards to about 200° C. or
lower with increase in amount of depressant added.

Broadly speaking, the compositions are prepared by
simple admixture of the two components. The polypyrrolidone is employed in finely divided form and if the other
component is liquid it is ordinarily absorbed in the powder
upon simple mixing, so that an apparently dry mixture is
produced. On the other hand if viscous liquids or solids
are employed, the compositions of the invention can be
prepared by warming the polymer and the melting point
depressant agent together, with stirring, until a substantially homogeneous composition is obtained, generally as
a liquefied melt, which may be transparent but in some
cases does not become entirely clear. This is used immediately if desired, or can be cooled and used at any
convenient later time. It will be apparent that other
modes of preparation can also be employed, such as solution of the components in a mutual inert low-boiling solvent followed by removal of the solvent, and the like.
While compositions comprising from about 70 percent
to as low as about 50 percent of polypyrrolidone by weight
can be used, especially since such compositions are found
to be castable as films in the relatively low temperature
range of 180° C. to 210° C., the casting of films at temperatures up to about 240° C. is possible employing compositions containing less melting point depressant.

The compositions are useful in the production of fibers
by spinning techniques such as extrusion at the melting
point. Ordinarily, it is preferred to use compositions containing 80 percent or more polypyrrolidone for this purpose. Extrusion is commonly followed by evaporation
of the depressant, or extrusion can be made directly into
solvents capable of removing the organic melting point
depressant agent from the polypyrrolidone. The choice
of solvent to be used for this purpose will be readily apparent from the properties of the substance to be dissolved. Alternatively, the organic melting point depressant agent can be left in the finished article to serve as a
plasticizer. The compositions are also useful in the production of tubing, filaments, rods, tapes and other shaped
articles by melt-extrusion at elevated temperatures.

The following examples, wherein all parts are by weight unless otherwise specified, will more particularly illustrate the preparation and properties of the compositions of the invention.

Example 1

To 70 parts of pure, finely divided polypyrrolidone having inherent viscosity 1.53 are added 30 parts of glycerine. The mixture is stirred gently with a paddle until all of the glycerine has been absorbed in the polypyrrolidone. The resulting mixture is a powder which appears somewhat damp but is unchanged in color from the original polymer. To determine the melting point of the mixture, a sample of convenient size is selected and heated carefully in a small flask, while stirring with a thermometer. At a temperature of approximately 220° C. the mixture begins to soften and finally becomes a melt. The source of heat is then removed from the container, and stirring is continued while the container cools in the air. The point at which crystallization just commences is taken as the melting point of the mixture. For the particular composition consisting of 70 parts of polymer and 30 parts of glycerine, the melting point thus obtained is 215° C.

When the composition prepared as set forth above is to be extruded, the following procedure is employed: a conventional extruder is used, consisting of an Exaloy-lined steel barrel about ¾" in inside diameter and 12" long provided with two controllable peripheral heating elements, one at the front or die end and one at the back or filling end of the barrel, a hopper for filling provided with a cooling jacket around the barrel at that portion, an attached die assembly, and a rotating hardened steel inner Archimedes screw driven by a variable speed motor. The composition is placed in the hopper and transported toward the die assembly by the screw which simultaneously compacts the granular composition and works it to some extent resulting in some heating. The composition is sufficiently heated by means of the peripheral heating elements so that it is melted when it enters the die assembly or it may be melted in the rearward portion of the die assembly by moderate further heating. The molten polymer is forced through the orifices of the die and the resulting filaments are drawn down while still hot and plastic, cooled by suitable means such as a bath of a liquid nonsolvent for the polymer, and wound on a suitable take-up reel. The denier of the filament is determined by the rate of wind-up, the tension, the draw down interval before cooling, and the viscosity of the melted extruded polymer. The degree of orientation of the filament, which is preferably kept low, is determined particularly by the tension between the wind-up means and the cooling medium.

In extruding the polymer composition produced as set forth above, the following conditions are employed. A bath of Stoddard solvent is used for quenching the fiber and a wind-up or take-up speed of 1000 feet per minute is employed. A die having an 0.059 inch diameter orifice is employed as a spinnerette. The extruder screw has one ⅜" thread per 1¹⁄₁₆" length, is ¾" in outside diameter and gives a compression ratio of 2.5. It is rotated at about 84 r.p.m. The glycerine-containing composition is added under atmosphere of nitrogen to the hopper in increments which replenish the supply contained in the extruder as rapidly as the latter is emptied by the screw. The back end heater is not used and the forward or die end heater (compression zone heater) is adjusted to 490° F. The molten polymer is forced through the orifice, and the resulting filament is passed through the quench bath for about 10 inches and then over a rotating drum to maintain even rate of draw, and finally is wound on a reel or pirn in substantially unoriented condition. The filament has inherent viscosity=1.16. When stretched about 600 percent immediately after extrusion, a colorless, oriented fiber is produced having a denier of about 1500; tenacity at break is about 3 g. per denier.

Example 2

The procedure of the foregoing example is repeated to produce granular compositions containing 30 parts of melting point depressant agent and 70 parts of polypyrrolidone, except that Cellosolve, butyrolactone, nitrobenzene, ethylene carbonate, diethylene glycol, dimethyl sulfoxide, propylene glycol, tetrahydrofurfuryl alcohol, pentaerythritol, sorbitol and urea are employed, respectively, instead of glycerine. The melting points of the resulting compositions are determined in the same way as set forth above. The melts obtained are not entirely clear in some cases and may show darkening. The melting point of the polypyrrolidone is lowered in each case, and fibers can be produced by drawing from the melt. The melting points of the compositions containing the various agents are found to be as follows.

TABLE 2

| Agent added: | Melting point, ° C |
|---|---|
| Control (no depressant agent) | 250 |
| Ethylene glycol | 225 |
| Cellosolve | 240 |
| Butyrolactone | 235 |
| Nitrobenzene | 240 |
| Ethylene carbonate | 215 |
| Diethylene glycol | 225 |
| Dimethyl sulfoxide | 235 |
| Propylene glycol | 240 |
| Tetrahydrofurfuryl alcohol | 235 |
| Pentaerythritol | 215 |
| Sorbitol | 220 |
| Urea | 220 |

Example 3

Compositions consisting of granular or powdered polypyrrolidone containing glycerine in various proportions are prepared according to the procedure of Example 1. The melting points and physical appearance of the resulting compositions are set forth in the following table:

TABLE III

| Parts polypyrrolidone | Parts glycerine | Melting point, ° C. | Remarks |
|---|---|---|---|
| 90 | 10 | 235 | Produces good fibers. |
| 80 | 20 | 225 | Produces excellent fibers. |
| 60 | 40 | 205 | Do. |
| 55 | 45 | 195 | Do. |
| 50 | 50 | 185 | Produces good fibers. |

All of the mixtures thus produced can be extruded from the molten state.

Example 4

A mixture of 10 parts of purified redistilled pyrrolidone and 90 parts of polypyrrolidone having an inherent viscosity of 2.0 is heated gradually to about 235° C., at which point the mixture forms a clear, colorless melt. The melt is then transferred to a hot, smooth, aluminum surface held at about 180° to 200° C. and spread to a thin film by means of a doctor blade. The pyrrolidone evaporates readily and after about 2 minutes the aluminum is cooled and the clear flexible tough, transparent, unoriented film of polypyrrolidone is removed.

A small portion of the above composition is heated at about 235° C. and hot-drawn into a fiber by touching the surface with a rod and withdrawing the rod and fiber formed thereon. The fiber is found to possess excellent flexibility and strength.

Example 5

Compositions containing about 50 percent and 30 percent of pyrrolidone monomer and 50 and 70 percent of polypyrrolidone, respectively, are prepared by the procedure of Example 4, heating the mixtures to 185° and 5° C., respectively. Each of these compositions is cast in Example 4 to provide desirable tough films comrable in all respects to those produced in Example 4. ιe composition containing about 50 percent of pyrrolinᴇ can also be melt-cast on aluminum plates heated 150° C. and held at that temperature for about 3 nutes. The films thus produced are comparable to ɔse produced at higher temperatures.

*Example 6*

A composition comprising 90 percent by weight polyrrolidone having inherent viscosity 2.0 and 10 pernt metacresol is prepared by stirring a mixture of 90 rts of polypyrrolidone and 10 parts of metacresol ιile heating to about 240° C. This composition is und to produce fibers by hot drawing from the melt described in Example 4, as well as by extrusion as ː forth in Example 1.

*Example 7*

Compositions comprising 80 percent by weight of lypyrrolidone of inherent viscosity 3.0 are prepared in ιich 20 percent by weight of various organic comunds are incorporated, using the procedure of Exιple 4, with the following results:

| Organic solvent | Liquefaction temperature |
| --- | --- |
| ethanolamine | Clear at 240° C. |
| nethyl-pyrrolidone-2 | Clear at 230° C. |

Similarly, compositions are prepared using 70 perɔt by weight of polypyrrolidone and 30 percent by ight of the organic solvent as set forth in the follow-; table.

| Organic solvent | Liquefaction temperature |
| --- | --- |
| inoline | Clear at 250° C. |
| ᵻthanolamine | Clear at 240° C. |
| nethyl formamide | Do. |

Fibers can be drawn from the melt formed by each mposition.

What is claimed is:

1. A stable melt-extrudable composition consisting ɿentially of catalyst-free polypyrrolidone, and, in an ːount ranging from an amount effective to bring about nificant reduction of the melting point up to about 30 ɿcent of the weight of the polypyrrolidone, a stable organic substance which has a solubility parameter value in the range of about 10 to about 20, which boils above about 150° C., which melts below about 270° C., and which is inert with respect to polypyrrolidone.

2. A stable melt-extrudable composition consisting essentially of catalyst-free polypyrrolidone, and, in an amount ranging from an amount effective to bring about a reduction of about 10° C. in the melting point of the said polypyrrolidone up to about 30 percent by weight of the polypyrrolidone, a stable organic substance which has a solubility parameter value in the range of about 10 to about 20, which boils above about 200° C., which melts below about 270° C., and which is inert with respect to polypyrrolidone.

3. A stable melt-extrudable composition comprising a major amount of catalyst-free polypyrrolidone and a minor amount, not less than that necessary to effect a reduction of about 10° C. in the melting point of the said polypyrrolidone, of a stable organic substance which has a solubility parameter in the range of about 10 to about 20, which boils above about 150° C., which melts below about 270° C. and which is inert with respect to polypyrrolidone.

4. A stable melt-extrudable composition consisting essentially of from 50 to 90 percent of catalyst-free polypyrrolidone, the remainder of said composition being glycerine.

5. A stable melt-extrudable composition consisting essentially of from 50 to 90 percent of catalyst-free polypyrrolidone, the remainder of said composition being added purified pyrrolidone monomer.

6. The process for the melt-extrusion of polypyrrolidone, which comprises the steps of melting and extruding a stable composition consisting essentially of a major amount of catalyst-free polypyrrolidone and a minor amount not less than that necessary to effect a reduction of about 10° C. in the melting point of the said polypyrrolidone, of a stable organic substance which has a solubility parameter value in the range of about 10 to about 20, which boils above about 150° C., which melts below about 270° C., and which is inert with respect to polypyrrolidone.

References Cited in the file of this patent

UNITED STATES PATENTS

| | | |
| --- | --- | --- |
| 2,638,463 | Ney et al. | May 12, 1953 |
| 2,723,248 | Wright | Nov. 8, 1955 |
| 2,739,959 | Ney et al. | Mar. 27, 1956 |
| 2,806,856 | Robinson | Sept. 17, 1957 |